(12) United States Patent  
Pluszynski et al.

(10) Patent No.: US 8,627,948 B2  
(45) Date of Patent: Jan. 14, 2014

(54) DRIVE AND TENSIONING UNIT FOR A SCRAPER CHAIN CONVEYOR

(75) Inventors: Andreas Pluszynski, Wuppertal (DE); Karl-Heinz Schurer, Herne (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 337 days.

(21) Appl. No.: 13/057,656

(22) PCT Filed: Jul. 22, 2009

(86) PCT No.: PCT/IB2009/053186  
§ 371 (c)(1),  
(2), (4) Date: Feb. 4, 2011

(87) PCT Pub. No.: WO2010/015961  
PCT Pub. Date: Feb. 11, 2010

(65) Prior Publication Data  
US 2011/0132728 A1 Jun. 9, 2011

(30) Foreign Application Priority Data  
Aug. 5, 2008 (DE) .................... 20 2008 010 791 U

(51) Int. Cl.  
*B65G 23/44* (2006.01)

(52) U.S. Cl.  
CPC .................................. *B65G 23/44* (2013.01)  
USPC ....................................................... 198/813

(58) Field of Classification Search  
CPC ................................................. B65G 19/287  
USPC ......... 198/813, 810.04, 812, 594, 595, 316.1, 198/860.1, 860.2, 861.1, 861.2, 735.1, 198/735.2, 735.6; 403/321–325, 315–317  
See application file for complete search history.

(56) References Cited

U.S. PATENT DOCUMENTS

| 2,815,114 A | | 12/1957 | Tracy |
| 3,797,949 A | * | 3/1974 | Petros ........................... 403/355 |
| 4,484,677 A | * | 11/1984 | Berwald .................... 198/735.1 |
| 4,560,059 A | * | 12/1985 | Braun et al. ............... 198/735.2 |
| 4,607,890 A | * | 8/1986 | Merten et al. .................... 299/43 |
| 6,708,817 B2 | | 3/2004 | Klabisch et al. |
| 7,104,392 B2 | * | 9/2006 | Klabisch et al. ........... 198/735.1 |

FOREIGN PATENT DOCUMENTS

DE 100 50 701 A1 5/2002

* cited by examiner

*Primary Examiner* — William R Harp  
(74) *Attorney, Agent, or Firm* — Foley & Lardner LLP

(57) ABSTRACT

A drive and tensioning unit for a scraper chain conveyor, in particular a face conveyor for drum cutter-loader mining apparatus, includes a telescopically configured machine frame having a machine frame base and a machine frame head, which is displaceable relative to the machine frame base by at least one hydraulic cylinder and has bearing recesses for supporting a chain drum shaft. Each hydraulic cylinder is supported at one end in a connecting joint on a side board of the machine frame head and at the other end in a connecting joint on a side wall of the machine frame base. The connecting joints include a recess in the side boards and the side walls and bearing brackets detachably anchorable in the recesses. Each of the recesses provided in the side boards and in the side walls are structurally identical.

21 Claims, 3 Drawing Sheets

DRIVE AND TENSIONING UNIT FOR A SCRAPER CHAIN CONVEYOR

The invention relates to a drive and tensioning unit for a scraper chain conveyor, in particular a face conveyor for drum cutter-loader mining apparatus, comprising a telescopically configured machine frame having a machine frame base, which is connectable to a line of troughs of the scraper chain conveyor, and a machine frame head, which is displaceable relative to the machine frame base by means of at least one hydraulic cylinder and has bearing recesses for supporting a chain drum shaft, each hydraulic cylinder being supported at one end in a connecting joint on a side board of the machine frame head and at the other end in a connecting joint on a side wall of the machine frame base.

BACKGROUND OF THE INVENTION

A drive and tensioning unit of the generic type is known from DE 100 50 701 B4. The known drive and tensioning unit has a hydraulic cylinder on both sides respectively and the scraper chain runs substantially horizontally through the machine frame both in the top strand and in the bottom strand and is reversed only at the chain drum. The known drive and tensioning unit is primarily suitable for use with gate conveyors and/or with plough systems. In order to utilize the drive and tensioning unit in mining installations as a face conveyor, particular problems in respect of hydraulic cylinders supported against the outer sides of the side boards or side walls consist in bridging the installation space necessary for these with the machine track. In earlier applications of the Applicant, it has been proposed for this purpose to arrange the hydraulic cylinders inside the machine frame, whereby, however, the wear-induced or repair-induced removal of the hydraulic cylinders is made considerably more difficult. Either the mining machine must be led away from the machine frame, in the case of externally fitted hydraulic cylinders, or the necessary connecting joints for fixing in place the hydraulic cylinders must first be removed, in the case of hydraulic cylinders arranged on one side.

SUMMARY OF THE INVENTION

An object of the invention is to provide a drive and tensioning unit, especially a drive end for a face conveyor of a drum cutter-loader mining apparatus, in which the aforementioned problems are avoided by dint of the design.

These and further objects are achieved according to the invention by the fact that each connecting joint comprises a recess in the side board or the side wall and a bearing bracket detachably anchorable in the recess, and that recesses of mutually identical construction are provided in both side boards, on the one hand, and in both side walls, on the other hand. An inventive configuration comprising recesses and comprising bearing brackets which can be removably inserted in the recesses enables hydraulic cylinders to be used on both sides or on one side only, according to the application, without the need to carry out further modifications to the drive and tensioning unit. At the same time, a solution according to the invention enables the same drive and tensioning unit to be used at both ends of a line of troughs, i.e. generally as a tensile auxiliary drive, irrespective of on which side the machine guide, due to the geological conditions, such as the direction of the dip, runs, since the identical construction of the recesses both on the stowage side and on the working face side of a face conveyor, or on the left and right of a gate conveyor, allows the optional use of the same hydraulic cylinder with the same bearing brackets on both sides of the drive and tensioning unit or of the machine frame.

In order to meet the above object, it is not absolutely necessary that the hydraulic cylinders, which generally can apply higher forces in the pressure direction than in the traction direction, can be supported against the machine frame without preferential direction. If the recesses in the side board are given a different configuration from the recesses in the side wall, then, correspondingly, differently configured connecting joint brackets can also be used. In a preferred embodiment, the recesses on the side board and the recesses on the side wall are identically constructed and also the connecting joint brackets for the two cylinder ends are identically constructed, so that only one connecting joint bracket and one shape of the recess has to be created to support both cylinders against the machine frame. At the same time, this embodiment minimizes the number of different components on a drive and tensioning unit. The recesses can be made directly in plate elements which form the side boards of the machine frame head or the side walls of the machine frame base. It is more advantageous if the recesses are an integral or constituent part of a bearing plate inserted in cavities or windows in the side wall and/or the side board, since this minimizes the production costs even where the geometry of the recess is complicated.

According to a particularly advantageous embodiment, the recess has a plurality of undercut retaining lugs and the bearing bracket comprises a base plate having a plurality of locking projections for undergripping or back-gripping the retaining lugs. In this embodiment, it is particularly expedient if the bearing bracket is displaceable between an assembly position and a locking position in the recess to enable the bearing bracket to be inserted into the recess in an assembly position and then displaced into a locking position in which it is secured against falling out of the recess by the interaction of the retaining lugs and locking projections and only a return displacement has to be prevented. The displacement of the bearing bracket can be effected, according to the available installation space, either parallel to the running direction of the chain or perpendicular thereto. The displacement perpendicular to the running direction has the advantage that all the forces which, upon actuation of the hydraulic cylinders, must be transmitted via the bearing bracket and the recess into the side wall or the side board can then be passed directly into this latter. If the direction of displacement is parallel to the running direction of the chain, and hence also parallel to the longitudinal extent of the scraper chain conveyor, it is particularly advantageous if the bearing bracket, in the locking position of the base plate, is or can be fixed in place in the recess by means of a separate locking piece engaging with a locking block at least partially in the recess. The locking block should preferably be configured such that it transmits the forces passed from the hydraulic cylinder into the bearing brackets reliably to the boundary walls of the recess or the adjoining wall portions of the side board or of the side wall.

Further preferably, the locking piece can comprise a screwing means, which can either be screwed directly into the bearing bracket or can be fixed indirectly to the bearing bracket. The arrangement of the screwing means is preferably chosen such that this is not subjected to load by the forces acting upon the bearing bracket, but in principle secures the locking piece against falling out of the recess only by positive back-gripping action.

For a favourable support, as well as fitting and removal of the hydraulic cylinders, it is further advantageous if the bearing bracket has two bearing arms with bearing eyes, which bearing arms jut up over the base plate, and hence in the assembled state protrude laterally over the side wall or side board. According to a particularly advantageous embodiment, a bearing bolt can be insertable into the bearing eyes, which bearing bolt is secured against falling out by means of locking plates detachably anchored to one or both bearing arms. If a two-sided removal option is given for the locking plate, the hydraulic cylinder can then be removed, irrespective of its state of attachment on the left or right side of the machine frame, even when the bearing bracket is placed in the recess and is anchored there. At the same time, through removal of the bearing brackets on one side of the machine frame, a one-sided arrangement of a hydraulic cylinder can be achieved, without the presence of stop elements which project laterally beyond the free, cylinderless side board or side wall. In drum cutter-loader mining apparatus, the possibility is thereby afforded of arranging a hydraulic cylinder on one side only, preferably only on the stowage side, this to allow the mining machine, in particular the drum cutter-loader, to be transported, in principle, right into the machine frame base and thus take off the entire line of troughs of a scraper chain conveyor at constant distance from the working face.

Further advantageously, preferably only, the machine frame head can have a top strand floor extending at least partially in a curve, in order to be able to use a chain drum of sufficient diameter, even if the drive and tensioning unit has short structural length, to reverse or drive the scraper chain of the scraper chain conveyor. The invention also relates to the connecting bracket, the bearing plate and/or the locking piece for a drive and tensioning unit with the aforementioned structure.

Further advantages and embodiments of a drive and tensioning unit according to the invention emerge from the following description of an illustrative embodiment, shown by way of example in the drawing, of a drive and tensioning unit according to the invention.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Figure 1:
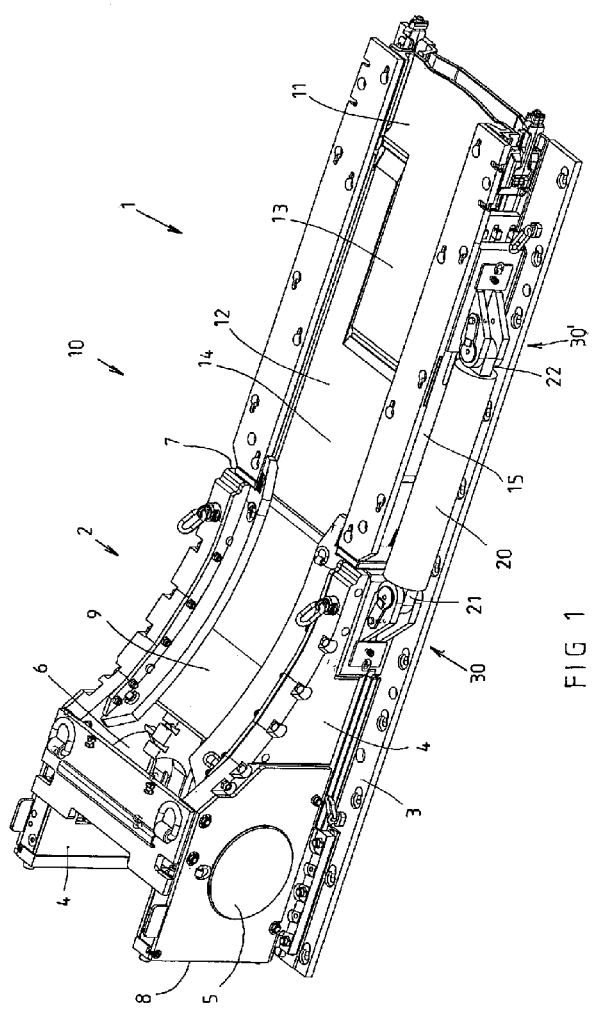
FIG. 1 shows in perspective view a drive and tensioning unit according to the invention with machine frame base and machine frame head, which are mutually displaceable by a hydraulic cylinder.

Referring now to the drawings wherein the showings are for the purpose of illustrating preferred and alternative embodiments of the invention only and not for the purpose of limiting same, FIG. 1 shows a drive and tensioning unit, denoted in its entirety by the reference symbol 10, which is attached to the head end of a scraper chain conveyor (not further represented), which is preferably used as a face conveyor in an underground mining operation. Since the structure and configuration of the non-represented scraper chain conveyor and also of the mining apparatus, formed preferably by a drum cutter-loader, are of no concern in this regard, no detailed description is here given of the scraper chain conveyor and/or of the mining apparatus. The drive unit 10 configured as a tensioning unit has a two-part machine frame comprising a machine frame base 1 and a machine frame head 2, which are here mounted on a common base plate 3. The machine frame head 2 has two lateral, strong side boards 4, which close to the rear frame head end are provided with two bearing receptacles 6, which are here closed off by means of plates 5 and in which there is configured a chain drum shaft (not represented) for the relocation of a chain drum serving to drive a conveyor chain with scrapers (likewise not represented here). As can be clearly seen from FIG. 1, the two side boards 4 climb on their top side, in an arc-shaped curve, from their front, trough-line-facing frame head end 7 to the rear frame head end 8 up to roughly the position of the bearing receptacles 6, and a top strand floor 9 also follows a correspondingly curved path to allow the scrapers and the scraper chain to be driven via a chain drum of sufficiently large circumference and simultaneously to ensure that the structural height of the conveyor pans, as well as the structural height of the machine frame base 1, can be relatively low.

In the represented illustrative embodiment, the machine frame base 1 has a split configuration comprising a first base part 11, which is fixedly connected to the conveyor pans of the scraper chain conveyor, and a second base part 12, which, together with the machine frame head 2, is displaceable relative to the said first base part, as can be seen particularly clearly from the split embodiment, shown in FIG. 1, of the top strand plate 13 in the base part 11 and top strand plate 14 in the base part 12. The base parts 11 and 12 of the machine frame base 1 are guided displaceably one inside the other, in a suitable manner not described in detail, so as to allow displacement of the base part 12 and the machine frame head 2, by means of preferably only one hydraulic cylinder 20, to the left in FIG. 1, and hence selectively tensioning of the scraper chain running through the whole of the scraper chain conveyor in the upper and bottom strands. The present invention relates to the fastening or support of the hydraulic cylinder 20, by one cylinder end 21, to or against the side board 4 of the machine frame head 2 and, by the other cylinder end 22, to or against one or both side boards 15 of the machine frame base 1, the said side board(s) 15 being immovably connected to the base part 11 of the machine frame base 1. The support or abutment of the ends 21, 22 of the hydraulic cylinder 20 against the side board 4 or side wall 15 is realized by means of connecting joints 30, 30', which in the shown illustrative embodiment are configured in identical construction and the structure of which shall now be explained in greater detail with reference to FIGS. 2 to 4.

Figure 2:
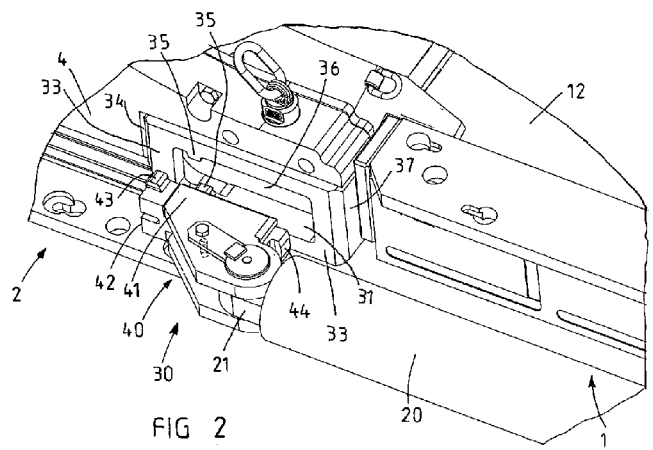
FIG. 2 shows schematically in exploded representation a connecting joint bracket at one end of a hydraulic cylinder prior to insertion into a recess on the machine frame head.
Figure 3:
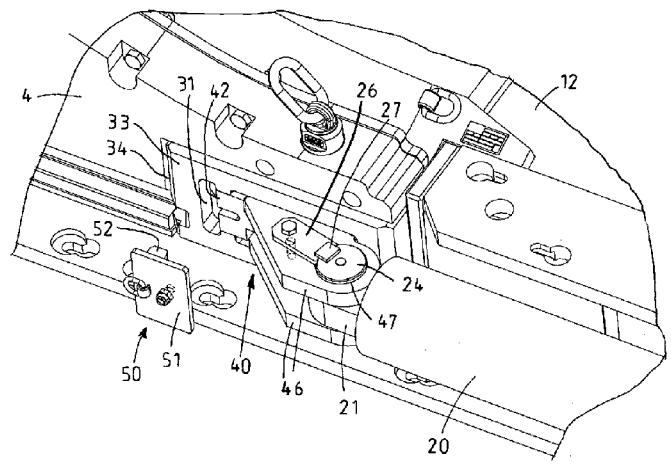
FIG. 3 shows in a view similar to FIG. 2 the connecting bracket in the locking position prior to the fitting of a locking piece.
Figure 4:
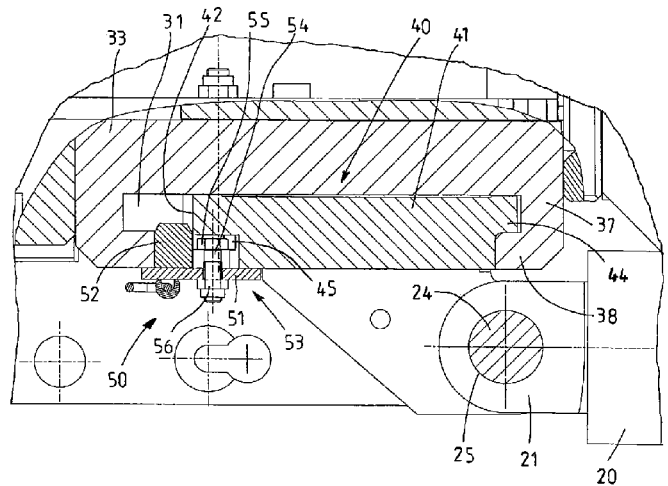
FIG. 4 shows in a horizontal section the connecting bracket and the recess in the assembled state.

FIGS. 2 to 4 show only the connecting joint 30 on that end 21 of the hydraulic cylinder 20 which is situated on the machine frame head side. Due to the preferably structurally identical shaping of the two connecting joints 30, 30', the following description also applies, however, to the connecting joint (30', FIG. 1) on the other cylinder end (22, FIG. 1). Each connecting joint 30 comprises a recess 31 in the plane of the side board 4 of the machine frame head base 2, and a connecting joint bracket 40, which can be detachably inserted into the recess 31 and removably locked therein, as will be further explained below. In the shown illustrative embodiment, the recess 31 is not formed directly in the side board 4 of the machine frame head 2, but is a constituent part of a bearing plate 33 which is welded into a congruently cut-out window 34 in the side board 4. From FIG. 2, it can be particularly clearly seen that the recess 31, towards the outer side of the side board 4, has an approximately rectangular internal cross section, which however, close to the rear end, here shown on the left, is cross-sectionally tapered by two retaining lugs 35, which jut into the recess 31 and make this narrower. The two retaining lugs 35 do not extend as far as the floor 36 of the recess, but only over approximately half the depth of the recess 31, whereby a free space is formed behind the retaining lugs 35. The retaining lugs 35 hence form undercut sections in the region of the recess 31. As can be clearly seen from FIG. 4, the boundary wall 37 of the bearing plate 33, which here directly adjoins the base part 12 of the machine frame base 1, is likewise provided with an undercut, web-shaped retaining lug 38, which once again extends only over about half the depth of the recess 31 in the bearing plate 33. The retaining lug 38 is formed by a web portion on the front boundary wall 37, which projects rearwards at right angles and beneath which an undercut free space is once again formed in the recess 31.

The bearing bracket 40 has a relatively strong base plate 41, which at the rear end 42 is provided with two lateral locking projections 43, one of which projects vertically upwards from the base plate 41 and the other of which (not shown) projects downwards in the same position. The locking projections 43 have only half the thickness of the base plate 41 and are designed to reach under or behind the free space in a positive-locking manner between the retaining lugs 35 and the floor 36 of the recess 31 in the bearing plate 33. The base plate 41 of the bearing bracket 40 is additionally provided at the, in FIG. 2 right-hand, front end with a further locking projection 44, which extends approximately over the full height of the bearing bracket 40 and which, once again, has only a depth designed such that the locking projection 44, as shown by FIG. 4, can reach behind the free space behind or beneath the retaining lug 38. The length of the recess 31 is designed such that the bearing bracket 40, in the assembly position shown in FIG. 2, can be inserted into the recess 31 and can be pushed in as far as the floor 36 of the recess 31. In this state, neither the locking projections 43 nor the locking projection 44 back-grip the associated retaining lugs 35 and 38. As a result of rightward displacement of the bearing bracket 40 in FIG. 2, i.e. to approach the line of troughs of the scraper chain conveyor, the bearing bracket 40 makes its way into a locking position in which the locking projections 43, 44 back-grip the retaining lug 35, 38, which locking position is represented in FIG. 3.

In order to be able to secure the locking position, prevent a return displacement of the bearing bracket 40 and, at the same time, pass forces applied by the hydraulic cylinders 20 into the bearing plate 33 and the side board 4 (or, at the other end of the hydraulic cylinder, into the side wall of the machine frame base), locking pieces 50 are inserted into the recess 31, which locking pieces have on the rear side of a locking plate 51 a locking block 52, the shaping of which is designed to fill the remaining space of the recess 31 behind the rear side 42 of the bearing bracket 40 in a positive-locking manner, as can be seen particularly clearly from FIGS. 3 and 4. In the assembled state, as shown in FIG. 4, the bearing bracket 40 is secured against slipping out of the recess 31, at the front end by being back-gripped by the locking projection 44 and retaining lug 38 and at the rear end by being back-gripped by locking projections 43 and retaining lugs 35, and the locking block 52 filling the free space of the recess 31 prevents displacement of the bearing bracket 40 back into the assembly position, in which solely a removal could take place. At the same time, the locking block 52 transmits those forces which have been generated upon actuation of the hydraulic cylinders 20 and have been passed into the respective cylinder end 21.

The locking piece 50 is secured in the locking position by means of screwing means 53, which here consists of a loose headed screw 54, which with its screw head 55 engages in an open-edged, slotted groove indentation 45 in the bearing bracket 40, and is fixed in place by means of a nut 56, which presses against a base plate 51 in order to clamp the locking piece 50 in the locking position. The removal of the locking piece 50 can only take place once the nut 56 is undone.

For the fastening of the end 21 of the hydraulic cylinder 20 to the bearing bracket 40, the latter has two mutually spaced bearing arms 46, which are both provided with a bearing eye 47 in which there is inserted a bearing bolt 24, which reaches through a further bearing eye 25 in the cylinder end 21. The bearing bolt 24 is secured against falling out by means of locking members 26, which are preferably screwed onto both bearing arms 46 and overgrip the end faces of the bearing bolt 24 at least with a butt plate 27.

For the person skilled in the art, numerous modifications which are intended to fall within the scope of the appended claims will emerge from the preceding description. The entire description has been given only for the connecting bracket 30 at the end situated on the machine frame head side. At the other end, a connecting joint of identical construction can be configured with the same connecting bracket and the same recess within an identically constructed bearing plate, only the connecting bracket and the bearing plate being fitted in mirror-inverted arrangement in a cutout in the side board of the machine frame base. If, by the shaping and design of the connecting joint bracket, it is intended to ensure that each hydraulic cylinder can be fitted only in a preferential direction, the two connecting brackets can differ from each other in terms of their construction or size. In addition, the connecting brackets can be provided with further or larger-sized locking pieces. The illustrative embodiment shows only one hydraulic cylinder, fitted on one side. Since identical recesses are present on the opposite side of the machine frame base and of the machine frame head, a second hydraulic cylinder can optionally be fitted on the opposite side, or a hydraulic cylinder is fitted solely on the other side, if, for example, the drive and tensioning unit 10 of identical construction is inserted at the other end of the scraper chain conveyor. Once the connecting joint brackets are removed, no parts of the connecting joints protrude over the side wall or side board, so that the guide for the drum cutter-loader or the mining apparatus must also be prevented from passing over corresponding projections by the provision of additional spacing.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A drive and tensioning unit for a scraper chain conveyor for a drum cutter-loader mining apparatus, comprising:
    a telescopically configured machine frame having:
        a chain drum shaft,
        a machine frame base having a side wall, and
        a machine frame head having a side board, the machine frame head being displaceable relative to the machine frame base and having bearing recesses for supporting the chain drum shaft;

at least one hydraulic cylinder coupled to the machine frame base and the machine base head, each hydraulic cylinder being supported at one end by a first connecting joint on the side board of the machine frame head and at the other end by a second connecting joint on the side wall of the machine frame base;

wherein the connecting joints comprise:
a recess in the side board and in the side wall, each of the recesses comprising at least one undercut retaining lug,
a bearing bracket detachably anchorable in each recess, each of the bearing brackets comprising a base plate having at least one locking projection for under-gripping or back-gripping the retaining lug,
a locking block removably disposed at least partially in the recess to restrict movement of the base plate, and
a locking plate removably coupled to the bearing bracket to restrict movement of the locking block.

2. The drive and tensioning unit according to claim 1, wherein the recesses on the side board and on the side wall are of mutually identical construction and the bearing brackets are of mutually identical construction.

3. The drive and tensioning unit according to claim 1, wherein the recess is an integral part of a bearing plate inserted in the side wall.

4. The drive and tensioning unit according to claim 1 wherein the recess is an integral part of a bearing plate inserted in the side board.

5. The drive and tensioning unit according to claim 1, wherein the recess has a plurality of undercut retaining lugs, and the base plate has a plurality of locking projections for undergripping the retaining lugs.

6. The drive and tensioning unit according to claim 5, wherein the base plate of the bearing bracket is displaceable between an assembly position and a locking position in the recess.

7. The drive and tensioning unit according to claim 6, wherein the locking block extends from one side of the locking plate.

8. The drive and tensioning unit according to claim 7, wherein the locking plate is removably coupled to the bearing bracket by a screw.

9. The drive and tensioning unit according to claim 1, wherein the bearing bracket has two bearing arms with bearing eyes, which bearing arms extend over the base plate.

10. The drive and tensioning unit according to claim 9, further comprising a bearing bolt that is insertable into the bearing eyes, which bearing bolt is secured against falling out by locking members detachably anchored to both bearing arms.

11. The drive and tensioning unit according to claim 1, wherein the machine frame head further comprises a top strand floor running at least partially in a curve.

12. The drive and tensioning unit of claim 1, wherein the machine frame head includes two side boards and the machine frame base includes two side walls, and wherein the recesses are structurally identical and are provided in both side boards and in both side walls.

13. A drive and tensioning unit for a scraper chain conveyor, comprising:
a telescopically configured machine frame having:
a machine frame base having two side walls, each side wall having a recess with at least one undercut retaining lug, and
a machine frame head having two side boards, each side board having a recess with at least one undercut retaining lug, the machine frame head being displaceable relative to the machine frame base;
a first hydraulic cylinder supported at one end by a first connecting joint on one of the side boards and at the other end by a second connecting joint on one of the side walls, and a second hydraulic cylinder supported at one end in a third connecting joint on the other side board and at the other end in a fourth connecting joint on the other side wall;
wherein each connecting joint comprises:
a bearing bracket detachably anchorable in the recess, each of the bearing brackets comprising a base plate having a locking projection and slidable within the recess between an assembly position in which the locking projection and the retaining lug are disengaged, and a locking position in which the locking projection and the retaining lug are engaged,
a locking block removably disposed at least partially in the recess to maintain engagement of the retaining lug and locking projection in the locking position, and
a locking plate removably coupled to the bearing bracket to restrict movement of the locking block.

14. The drive and tensioning unit of claim 13, wherein all of the recesses are of mutually identical construction and all of the bearing brackets are of mutually identical construction.

15. The drive and tensioning unit according to claim 13, wherein the recesses are an integral part of a bearing plate inserted in the side wall and the side board.

16. The drive and tensioning unit according to claim 13, wherein the recesses have a plurality of undercut retaining lugs, and the base plate has a plurality of locking projections for undergripping the retaining lugs.

17. The drive and tensioning unit according to claim 13, locking block extends from one side of the locking plate.

18. The drive and tensioning unit according to claim 17, wherein the locking plate is removably coupled to the bearing bracket by a screw.

19. The drive and tensioning unit according to claim 13, wherein the bearing bracket has two bearing arms with bearing eyes, which bearing arms extend over the base plate.

20. The drive and tensioning unit according to claim 19, further comprising a bearing bolt that is insertable into the bearing eyes, which bearing bolt is secured against falling out by locking members detachably anchored to both bearing arms.

21. The drive and tensioning unit according to claim 13, wherein the machine frame head further comprises a top strand floor running at least partially in a curve.

* * * * *